April 28, 1959

J. LARKIN ET AL 2,884,024

VALVE SYSTEM

Filed Jan. 7, 1957

INVENTORS.
James Larkin
Woodrow S. Boedecker
BY
Atty

INVENTORS.
James Larkin
Woodrow S. Boedecker
Atty

United States Patent Office 2,884,024
Patented Apr. 28, 1959

2,884,024
VALVE SYSTEM

James Larkin, Hillside, and Woodrow S. Boedecker, Elmhurst, Ill., assignors to The Bastian-Blessing Company, Chicago, Ill., a corporation of Illinois Application January 7, 1957, Serial No. 632,836

6 Claims. (Cl. 141—218)

This invention relates generally to liquefied petroleum gas dispensing systems, and more particularly to apparatus for terminating the flow of liquid into a tank when the liquid reaches a predetermined level.

Various means have been used heretofore for terminating the flow of liquefied gas into a tank when a predetermined liquid level was attained. These means have included manually operable valves, conventional float-actuated valves and various systems which have either required skill and attention upon the part of the operator or else have involved mechanical linkages entailing operational lag. The inaccuracies inherent in these systems have resulted in termination of the flow of liquid before optimum level is reached, or excessive filling as a result of the said operational lag.

The present invention is directed to an improved means utilizing the natural properties of liquefied gas itself in terminating the flow of replenishing liquid into a tank. In particular, the properties of low temperature resulting from vaporization accompanying high heat exchange when the pressure is diminished, are utilized.

Accordingly, it is an object of the present invention to provide a liquid level control assembly by means of which the flow of feed liquid may be readily terminated with a high degree of accuracy in response to which may be generically termed an energy condition of the liquid itself.

Another object of the invention is to provide a device of the type stated in which the flow of liquid is terminated automatically without the need of attention on the part of skilled personnel.

A further object of the invention is to provide a novel construction in which a portion of the liquid in the tank is segregated from the mass of liquid, and the expansion of this segregated portion is utilized for furnishing power to positively terminate the liquid feed.

A further object is the use of a liquid vaporizable at atmospheric pressure and within the range of normal atmospheric temperatures to cause a pressure differential on opposite sides of a movable wall of a thermostatic member as a source of power to release a self-closing valve.

Another object is the provision of a level control device as described, wherein the chill of vaporization of educted liquid is effective to actuate a thermostatically controlled piston release means for establishing and terminating the flow of replenishing liquid into the container and the outflow of liquid educted from the container simultaneously by the temperature-responsive means mentioned.

Other objects and advantages of the invention will become apparent as the description proceeds in accordance with the drawings, in which.

Figure 1:
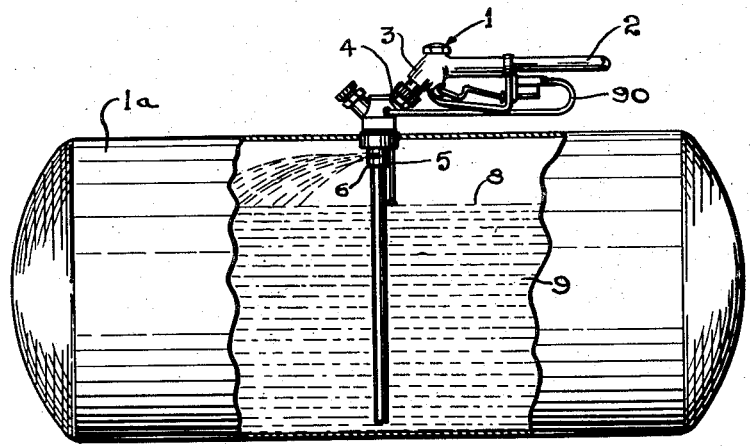
Figure 1 is an elevational view of a liquid control assembly in accordance with the present invention, and shown in conjunction with a filling apparatus.

Referring now to the drawings, and more particularly to Figure 1, the liquid level control assembly of the present invention is indicated generally by reference numeral 1, and is shown in operative relationship to the tank filling apparatus. This apparatus includes a fill line 2 having a cut-off valve 3 and a filler valve 4 desirably of the type described and claimed in the Sundstrum Patent, No. 2,713,874, issued July 26, 1955. The present liquid level control assembly is also shown in operative relationship to a visual fill indicator 5 preferably of the type described and known as a slip tube or 10% outage gauge in the Buttner Patent, No. 2,440,230, issued April 20, 1948. When the liquid has entered through the filler valve 4, it is then discharged into the interior of the tank 1a by means of a valve 6 which desirably takes the form of a spray valve of the type set forth in the Poethig et al. Patent No. 2,813,402. In the present invention, the liquid level control assembly operates in response to a reduction in pressure and temperature caused by expansion of a portion of the liquid educted from the interior of the tank when the level 8 of liquid 9 in the tank 1a reaches a predetermined height.

Figure 2:
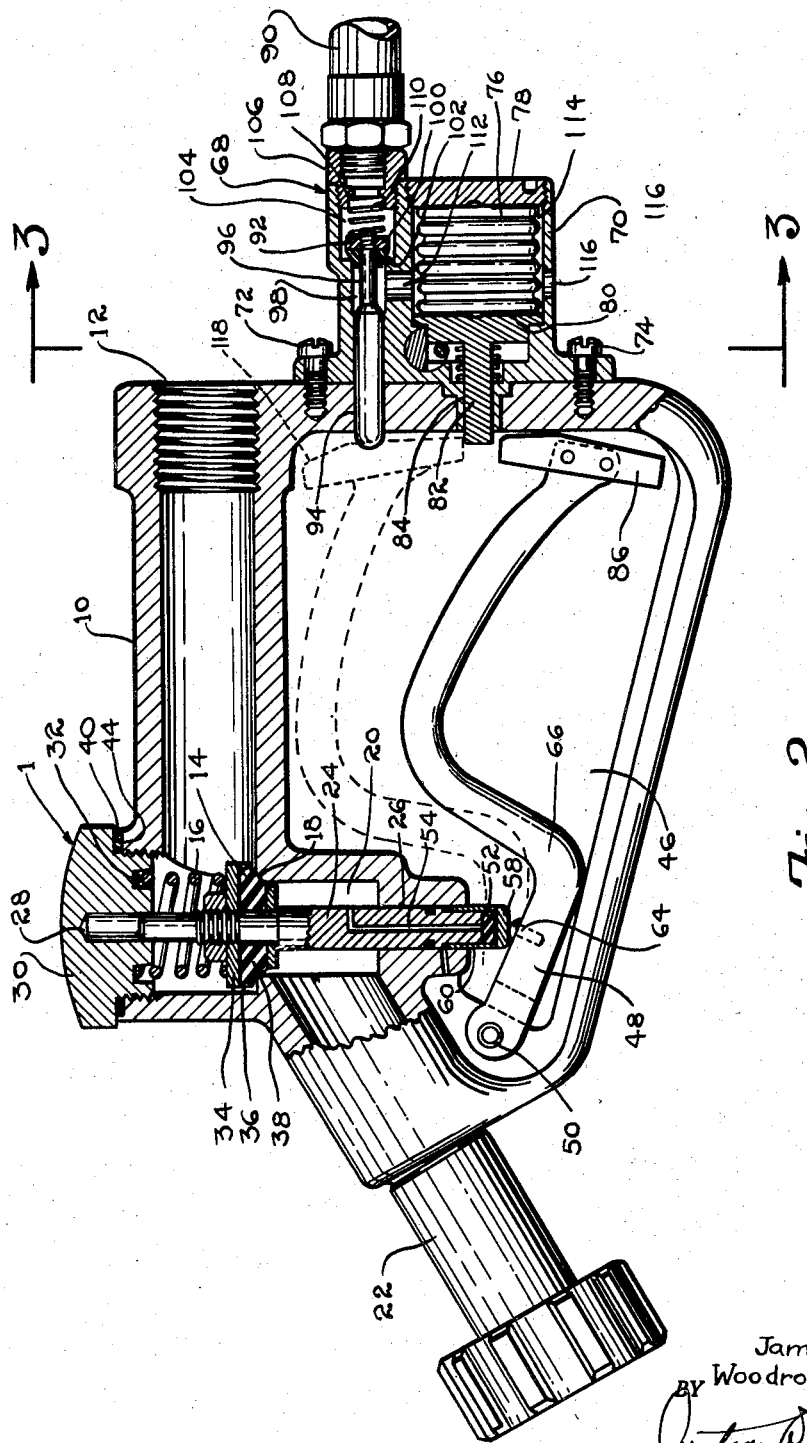
Figure 2 is a vertical sectional view of a valve forming a part of the liquid level control assembly of the present invention in closed position.

Referring now to Figure 2, the control assembly 1 includes a valve body 10 provided with a longitudinally extending bore 12 threaded to receive the pipe line, and a valve 14 biased by a helical spring 16 into sealing relationship with a valve seat 18 so as to be in the path of flow of liquid introduced by the aforementioned pipe line as it passes through the passage 12 and into a chamber 20, thence to be introduced into a tank through a tailpiece 22.

The valve 14 is guided vertically by means of a valve stem 24 having its lower end received in a bore 26 and its other end in a bore 28 defined in a cap 30 threadedly received in the valve body 10, and defining also an annular recess 32 for receiving the upper end of the helical spring 16, the lower end of the spring being adapted to seat upon a metallic disc 34 having a depending annular flange 36 in which is received a resilient sealing disc 38.

In order to insure effective sealing relationship between the cap 30 and the valve body 10, a gasket or O-ring 40 is provided between the head portion and an annular recess 44 in the valve body which may be compressed slightly by the engagement of the cap in the valve body for more effective sealing. The lower portion of the valve body 10 defines a relatively large compartment 46 into which the lower portion of the valve stem 24 extends; and in order to permit selective seating and unseating of the valve 14, a lever handle 48 is pivotally secured by means of a roll pin 50 within the compartment and upon the body 10, adjacent the said lower extremity 26 of the valve stem.

During the operation of the device, as hereinafter set forth, closing of the valve 14 coincides with the release of the lever 48 of the control means, and when the valve 14 closes a back-up pressure is created in the tailpiece 22 when the back-flow check valves in the fill line close, that are indicated in the aforementioned Patent No. 2,813,402. In order to relieve this condition, the valve stem 24 has provided therein a bleed passage 54 closed by a valve 52 slidably mounted on the lower end of the valve stem 24. When the valve is open, pressure in the tailpiece 22 is released through passage 54 so that the control assembly can be disconnected from the tank fitting safely without an explosive effect. The valve 52 is carried by a cup 58 and is adapted to be engaged by a rivet 64 carried upon the transverse extension 66 of the handle 48. When the handle 48 is lifted upwardly into valve-opening position, as hereinafter further described, the rivet 64 acts to move the valve stem upwardly with the valve 52 in snug abutting engagement with the end of the reduced portion 60. When the handle 48 is released, the valve 52 is released and permitted to open.

In order to hold the lever handle 48 in valve-opening position, as shown in dot-and-dash, an automatic latching and valve control assembly 68 is provided including a housing 70 secured by bolts (such as the bolts 72 and 74) to the valve body 10. Forming a part of the closure apparatus is an expansible chamber 76 which takes the form of a bellows containing a liquefied gas which is actuated in response to a temperature change in its environment as when liquefied gas is directed from the 10% tube gauge 5 against the chamber 76 where it vaporizes with a refrigerating action. The bellows is mounted in place on the remote wall 78 which is threadedly received in the unit 70, so that the lower end 80 of the bellows is free to move. The freely movable end 80 carries a latch 82 axially thereon which is slidably received in a bore 84 for selective support and release of a shoe member 86 fixedly secured to the handle 48 at its outer extremity, the support and release action of the expansible chamber 76 being substantially as described in the Williams application, Serial No. 539,721.

In order to introduce liquid from the 10% tube gauge 5 through the conduit 90 and into heat exchange relationship with the chamber 76, as hereinafter set forth, a check valve 92 is provided having a relatively enlarged end slidably received in a bore 94 in the valve body 10, and a portion 96 of reduced diameter extending into a relatively enlarged portion 98 of the bore 94. The end of the reduced portion 96 has threadedly received thereon a valve head 100 adapted to seat on the annular shoulder 102 defined by the relatively enlarged access chamber 104 which comprises the outermost extension of the bore 94. The conduit 90 is threadedly received in a coupling nut 106 which is, in turn, threaded in the bore 104 and has a recess 108 for receiving the outer end of a helical spring 110 adapted to bias the valve 92 toward the chamber 46, and having its inner end in abutting engagement with the piston head 100. The intermediate portion 98 of the bore 94 is connected with a downwardly opening passage 112 for venting fluid from the conduit 90 into a chamber 114 containing the bellows or chamber 76. In order to vent fluid introduced into the chamber 114, an outlet opening 116 is defined in the cylindrical wall of the unit 70.

In the normal operation of the device, the valve 92 is normally closed, but is opened and held in open position by means of the shoe 86 whose lower end is engaged by the latch 82 in valve-opening position when the handle 48 is actuated to open the filler valve 14. However, when the bellows or chamber 76 retracts, the shoe 86 moves the arm 48 downwardly by the spring 16, and the plunger or piston 94 moves outwardly along a cam surface 118 on the shoe 86. Upon completion of the downward movement of the arm 48, the valve head 100 seats on the valve seat 102. Thus, the valves 14 and 92 are opened and closed substantially simultaneously.

Figure 3:
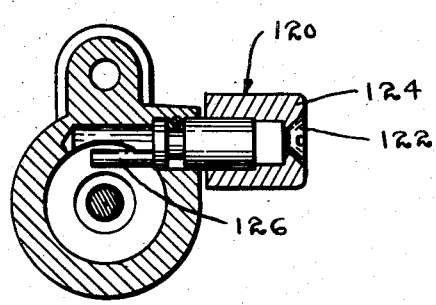
Figure 3 is a vertical sectional view of the control assembly for the valve taken through the lines 3—3 of Figure 2.
Figure 5:
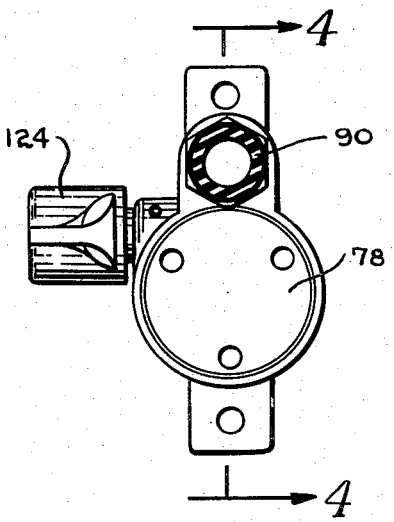
Figure 5 is an end view of the control assembly.
Figure 4:
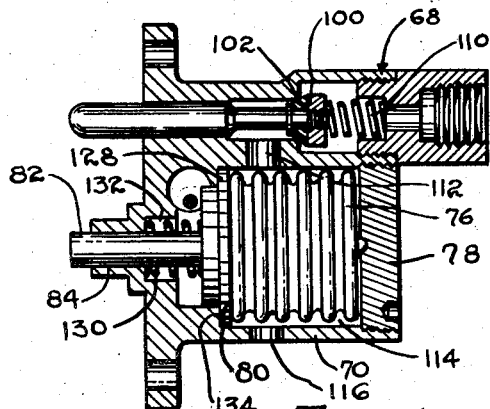
Figure 4 is a vertical sectional view of the control assembly of the invention taken through the lines 4—4 of Figure 5.

As seen in Figures 3 through 5, means are provided for releasing the latch or plunger 82 manually if so desired, and includes a cam assembly 120 having secured thereto by means of a screw 122 a lever handle 124 for manually rotating a cam extension 126 against the forward wall 80 of the bellows 76. This wall includes a bearing plate 128 against which one end of a helical spring 130 is seated, the front end of the spring bearing against the bottom surface of an annular recess 132 opening into the bore 84. Thus, the spring 130 not only aids in providing quick action in the bellows 76 when the previously referred to heat exchange reaction with liquid occurs upon filling of the container to the desired level, but also when manually releasing the filler valve. Furthermore, the exposed end of the plunger 82 is preferably straight across so that it serves as a two-way latch. As shown in Figure 2, it locks the handle 66 closed by engagement with the shoe 86 thereon until the lever handle 124 is operated. This prevents accidental or inadvertent opening of the valve 38. Thereafter, once the valve 38 is open, it can be closed automatically as described or manually by again operating the lever handle 124.

The handle 124 may be rotated to any desired extent in accordance with the foregoing description, and suitable indicia can be provided thereon if desired, to indicate the direction when the pin 126 is in the position shown in Figure 4. The shoulder 134 defined in the body 70 acts as an abutment to determine the normal latching position of the said plunger.

In operation, the lever handle 124 is actuated by one hand after the filler connection is made secure, and the lever 48 is manually raised by the other hand so that the valve 38 is opened. The cam 126 is then released and filling can proceed without further attention of the attendant because the cam portion 118 has opened and the shoe 86 holds the plunger 94 in open position. The plunger 94 opens the 10% gauge valve 92 and thereby brings into operation the means by which automatic shut-off will be accomplished.

As the liquid rises in the tank, it enters the lower end of the 10% tube gauge 5 which is provided with a bell-shaped hood to protect the liquid in the tank from the direct influence of the liquid sprayed from the valve 6, and to serve as a wide mouth funnel to prevent false indications of liquid that might otherwise enter the tube by capillary action. When the liquid emerges from the conduit 90 and passes into the closure assembly 68, it expands and gasifies, and heat is absorbed from the bellows 76 which is positioned in the path of the expanding gases. The pressure within said bellows consequently decreases, and the entire bellows contracts. As the bellows contracts, the shaft or plunger 82 is moved to the right, until it just clears the edge of the shoe 86. This action is aided, as indicated, by the spring 130. Thereupon the shoe 86 will move downwardly together with the entire handle 48, and because the plunger 82 at its outer end is relatively close to the cam portion 86, the camming action of the plunger or piston will take place immediately as actuated by the spring 130. By this means, the valve 14 is rapidly and efficiently closed in response to an energy condition of the liquid itself. At the same time, the valve head 100 seats on the valve seat 102, and any further entrance of liquid into the closure assembly 68 is prevented. Thus, the level detected by the 10% tube gauge 5 is maintained instantly against lag, such as would normally be produced by further introduction of fluids into the closure assembly 68 and out through the aperture 116.

Having thus described the invention in elaboration, it will be seen how the objects of the invention are attained. The quick action afforded by the bellows 76 as actuated by spring 130 permits an accuracy of control which is maintained by the plunger assembly 94. The heat present in the expansible chamber 76 assures the pressure differential developing when the liquefied gas begins to expand. Also, it will be noted in splash filling systems that on up until the time liquid is inducted through the 10% tube gauge, the temperature of the vapor flowing from the nozzle of the conduit 90 gradually increases due to vapor compression during filling, and will tend to warm the expansion chamber and secure the latching relationship. Then, when liquid is inducted, a good supply of latent heat will be present in the expansion chamber to assure vaporization even in very cold climates. In- stantaneous shut-off action of the valve 14 is assisted by the bleed valve on the valve stem 24 which permits an immediacy of response not available in any previous control system.

Consequently, it will be readily apparent to those skilled in the art that various and further changes can be made without departing from the spirit of the invention, the scope of which is commensurate with the appended claims.

We claim:

1. Apparatus for terminating the flow of liquefied gas into a closed container upon reaching a predetermined level comprising a filler valve biased to close and arranged in the path of incoming liquid, manual means for moving said valve to its open position, latch means urged to engage said manual means for holding said valve in its open position prior to attainment of said predetermined level, means responsive to the chill of vaporizing liquefied petroleum gas for retracting said latch means to permit said valve to close when contacted by liquefied petroleum gas in its liquid phase, and check valve means controlled by said manual means for controlling the flow of liquid petroleum gas fluid to said temperature responsive means to shut off flow of liquid to said temperature responsive means when said latch means releases said manual means.

2. Apparatus for terminating the flow of liquefied gas into a closed container upon reaching a predetermined level comprising a filler valve biased to close and arranged in the path of incoming liquid, first means for moving said filler valve into open position, temperature responsive means adapted to engage said means for moving said filler valve into open position, temperature responsive means for holding said first means in filler valve opening position prior to attainment of said predetermined level to permit said valve to close conduit means for directing liquefied petroleum gas in its liquid phase against said temperature responsive means when said predetermined level is reached and including a valve member held by said first means in open position when said filler valve is held open thereby and biased to shut off flow of liquid to said temperature responsive means, said temperature responsive means including a bellows engaged by said gas in its liquid phase and normally expanded into position to maintain said engagement with said first means to hold said filler valve open, and a spring urging closure of said valve member whereby release of said first means closes both valves substantially instantaneously.

3. Apparatus for terminating the flow of liquefied gas into a closed container upon reaching a predetermined level comprising a valve biased to close and arranged in the path of incoming liquid, manual means for moving said valve into open position, temperature responsive means including a plunger engaging said manual means for maintaining said manual means in valve opening position prior to attainment of said predetermined level, said temperature responsive means including a bellows normally expanded into position to maintain said engagement by said plunger with said manual means and a spring urging release of said plunger and conduit means including a valve element engaged by said manual means for directing liquefied petroleum gas against said bellows and manually operable means for selectively holding said plunger out of engagement with said temperature responsive means.

4. Apparatus for terminating the flow of liquefied gas into a closed container upon reaching a predetermined level comprising a valve biased to close and arranged in the path of incoming liquid, manual means for moving said valve into open position, temperature responsive means for maintaining said means in valve opening position, valve means responsive to said releasing movement of said manual means operable to direct liquefied petroleum gas against said temperature responsive means in its liquid phase at atmospheric pressure, shut off flow of liquid to said temperature responsive means to release said manual means and close said valve and said valve means.

5. In an apparatus for terminating the flow of liquefied gas into a container upon reaching a predetermined level having a valve biased to close and arranged in the path of incoming liquid, said valve including a valve body defining a valve seat and a valve stem slidably received in said bore, said valve body including a passageway for said incoming liquid including a tailpiece and said valve stem defining a bleed passage venting at the lower end thereof, a cap slidably mounted at the lower end of said valve stem, said valve body defining outlet means adapted to be in register with said cap, the combination of a lever pivotally mounted in said valve body and adapted to engage said cap to move said valve stem and valve into open position and to dispose said cap in position to release back up pressures which may be induced in said tailpiece upon attainment of said predetermined level, temperature responsive means normally engaging said lever to maintain it in open valve position under normal temperature conditions and to release said lever in response to vaporization of liquid thereagainst, and valve means adapted to be held open by said lever in its valve opening position to direct liquid at atmospheric pressure against said temperature responsive means upon attainment of said predetermined level, and release said lever from its valve opening position.

6. In an apparatus detachably received in sealed communication with a storage container for terminating the flow of liquefied gas into the storage container upon a predetermined level being reached having a valve biased to close in the path of incoming liquid, manual means including a pivotally mounted lever having a cam shoe for moving said valve into open position, the combination of a temperature responsive means including a thermo sensitive element for releasably maintaining said manual means in valve opening position, valve means for directing liquefied petroleum gas in its liquid phase against said temperature responsive means controlled by movement of said manual means to shut off flow of liquid to said temperature responsive means, said temperature responsive means including a plunger engaging said shoe for holding said valve in its open position, said temperature responsive means including a plunger and a valve controlled thereby for admitting liquefied petroleum gas to flow in its liquefied phase against said bellows, and said shoe including a cam surface adapted to engage said plunger to hold it in open position to admit liquid to said thermo sensitive element when said manual means is in valve opening position and to release said plunger upon movement out of said valve opening position.

References Cited in the file of this patent

UNITED STATES PATENTS

| | | |
|---|---|---|
| 2,083,078 | Mayo | June 8, 1937 |
| 2,470,368 | Paxton | May 17, 1949 |
| 2,489,028 | Graham et al. | Nov. 22, 1949 |